United States Patent

Fujiwara et al.

(10) Patent No.: US 10,876,611 B2
(45) Date of Patent: Dec. 29, 2020

(54) LOCK-UP DEVICE AND TORQUE CONVERTER

(71) Applicant: Kabushiki Kaisha F. C. C., Shizuoka (JP)

(72) Inventors: Hiromi Fujiwara, Shizuoka (JP); Hiroshi Asai, Shizuoka (JP); Seiji Saiga, Shizuoka (JP); Shogo Enya, Shizuoka (JP); Katsuhiro Shimizu, Shizuoka (JP)

(73) Assignee: KABUSHIKI KAISHA F.C.C., Hamamatsu (JP)

( * ) Notice: Subject to any disclaimer, the term of this patent is extended or adjusted under 35 U.S.C. 154(b) by 161 days.

(21) Appl. No.: 15/036,017

(22) PCT Filed: Nov. 11, 2014

(86) PCT No.: PCT/JP2014/079813
§ 371 (c)(1),
(2) Date: May 11, 2016

(87) PCT Pub. No.: WO2015/079901
PCT Pub. Date: Jun. 4, 2015

(65) Prior Publication Data
US 2016/0290462 A1 Oct. 6, 2016

(30) Foreign Application Priority Data

Nov. 28, 2013 (JP) .................. 2013-245828

(51) Int. Cl.
*F16H 45/02* (2006.01)
*F16F 15/123* (2006.01)
*F16D 25/0635* (2006.01)

(52) U.S. Cl.
CPC ......... *F16H 45/02* (2013.01); *F16D 25/0635* (2013.01); *F16F 15/123* (2013.01);
(Continued)

(58) Field of Classification Search
None
See application file for complete search history.

(56) References Cited

U.S. PATENT DOCUMENTS 4,360,352 A * 11/1982 Lamarche ........... F16F 15/1234
192/213
4,903,803 A * 2/1990 Koshimo .......... F16F 15/12326
192/205

(Continued)

FOREIGN PATENT DOCUMENTS

JP H10-169714 A 6/1998
JP 2002-048217 A 2/2002

(Continued)

OTHER PUBLICATIONS

International Search Report, PCT/JP2014/079813.

*Primary Examiner* — Charles A Fox
*Assistant Examiner* — Ryan P Dodd
(74) *Attorney, Agent, or Firm* — Polsinelli PC

(57) ABSTRACT

A torque converter includes a lock-up device that directly connects a torque converter cover that rotates together with a pump impeller to a turbine runner connected to an output axis. The lock-up device includes a damper spring in a clutch piston that contacts with or moves away from the torque converter cover. In addition, an intermediate member is provided inside the damper spring. A center part of the damper spring is projected toward the inner side of the clutch piston in the radial direction by damper pressing portions and fixed to both ends of the damper spring and a connecting member and pushed onto the projecting part of the intermediate member.

14 Claims, 6 Drawing Sheets

(52) U.S. Cl.
CPC ............... *F16H 2045/0205* (2013.01); *F16H 2045/0221* (2013.01); *F16H 2045/0278* (2013.01)

(56) References Cited

U.S. PATENT DOCUMENTS

| | | | | |
|---|---|---|---|---|
| 4,969,544 | A | * | 11/1990 | Fujimoto ................ F16H 45/02 192/214.1 |
| 5,009,301 | A | * | 4/1991 | Spitler ................ F16F 15/1234 192/213.3 |
| 5,224,576 | A | * | 7/1993 | Fujimoto ................ F16H 45/02 192/212 |
| 5,984,065 | A | | 11/1999 | Teramae et al. |
| 6,571,929 | B2 | | 6/2003 | Tomiyama et al. |
| 7,284,645 | B2 | * | 10/2007 | Yamamoto ............. F16H 41/28 192/112 |
| 8,047,922 | B2 | * | 11/2011 | Maienschein ..... F16F 15/12366 464/68.8 |
| 9,080,613 | B2 | | 7/2015 | Ito et al. |
| 9,677,642 | B2 | * | 6/2017 | Asai ..................... F16F 15/1207 |
| 2001/0052443 | A1 | | 12/2001 | Tomiyama et al. |
| 2004/0216979 | A1 | * | 11/2004 | Yamashita ........ F16F 15/12366 192/212 |
| 2008/0011570 | A1 | * | 1/2008 | Kubota ................... F16H 45/02 |
| 2009/0071786 | A1 | * | 3/2009 | Tsuboi ...................... F16D 3/12 192/3.29 |
| 2012/0252586 | A1 | * | 8/2012 | Takikawa ................. F16D 3/66 |
| 2014/0251746 | A1 | | 9/2014 | Ito et al. |

FOREIGN PATENT DOCUMENTS

| | | | | |
|---|---|---|---|---|
| JP | 2005-282651 | A | | 10/2005 |
| JP | 2006-037977 | A | | 2/2006 |
| JP | 2009-002358 | A | | 1/2009 |
| JP | 2013-096558 | A | | 5/2013 |
| JP | 2014156923 | | * | 8/2014 ............. G08C 23/04 |

* cited by examiner (A)

(B)

LOCK-UP DEVICE AND TORQUE CONVERTER

CROSS REFERENCE TO RELATED APPLICATIONS

This application is a national stage application (under 35 U.S.C. § 371) of PCT/JP2014/079813, filed Nov. 11, 2014, which claims priority to Japanese Application No. 2013-245828, filed Nov. 28, 2013, the contents of which are incorporated herein by reference in their entireties.

TECHNICAL FIELD

The present invention relates to a lock-up device in a torque converter that amplifies a driving force from an engine with hydraulic oil to transmit to an output axis and to a torque converter including the lock-up device.

BACKGROUND ART

A torque converter has been mainly provided between an engine and a transmission in a self-propelled vehicle (so-called automatic car) that includes an automatic transmission. A torque converter is a mechanical device that amplifies a driving force from an engine to transmit to an output axis by circulation of hydraulic oil between a pump impeller and a turbine runner that face each other. In the torque converter, a lock-up device is provided to improve fuel-efficiency of the vehicle.

In a lock-up device, a clutch piston connected to a turbine runner contacts with or moves away from a torque converter cover that is rotationally driven together with a pump impeller. With contact of the clutch piston to the torque converter cover, the pump impeller and the turbine runner are connected, and a driving force of the pump impeller side is directly transmitted to the turbine runner side.

In a lock-up device, a coiled damper spring is provided between the clutch piston and the turbine runner to attenuate driving force variation (also referred to as "torque variation") from the engine. For example, a lock-up damper mechanism (corresponding to lock-up device) is disclosed in PATENT LITERATURE 1 listed below. In the lock-up damper mechanism, damper springs that are serially arranged are connected via an intermediate supporter of a ring-shaped intermediate member. Accordingly, movement of the damper spring to the outer side of a piston member (corresponding to clutch piston) in the radial direction is regulated.

CITATION LIST

Patent Literature

PATENT LITERATURE 1: JP-A-10-169714

In the lock-up damper mechanism disclosed in PATENT LITERATURE 1 listed above, movement of the damper springs connected to each other by the intermediate supporter to the outer side in the radial direction as a whole can be regulated to some extent. However, each of the damper springs connected by the intermediate supporter is not regulated at all. Therefore, there is still a problem that attenuation performance of torque variation of an engine is lowered because of increased hysteresis torque due to friction with a piston member caused by movement of the damper springs to the outer side in the radial direction.

The present invention has been developed to deal with the problem described above. The purpose of the present invention is to provide a lock-up device and a torque converter that can suppress hysteresis torque due to friction between a damper spring and a clutch piston and improve attenuation performance of torque variation of an engine.

SUMMARY OF THE INVENTION

A feature of the present invention to accomplish the purpose described above is a lock-up device that includes: a disk-shaped clutch piston supported so as to contact with or move away from a pump impeller that is rotationally driven by a driving force of an engine; a coiled damper spring provided to the clutch piston along a circumferential direction; a connecting member for connecting the clutch piston to a turbine runner provided to face the pump impeller via hydraulic oil, the clutch piston and the turbine runner being connected via the damper spring; a pair of damper pressing portions for sandwiching the damper spring from both ends of the damper spring to push the damper spring so that a center part of the damper spring projects toward an inner side of the clutch piston in a radial direction; and an intermediate member with a projecting part formed to project toward an outer side of the clutch piston in the radial direction than a side surface of the inner side of the clutch piston in the same radial direction in the center part of the damper spring. In this case, the present invention covers a case where the clutch piston directly contacts with the pump impeller and a case where the clutch piston indirectly contacts with the pump impeller via a part rotationally driven together with the pump impeller (for example, torque converter cover).

According to a feature of the present invention with this structure, in the lock-up device, the damper pressing portions press the center part of the damper spring onto the projecting part of the intermediate member. Therefore, displacement and deformation of the damper spring to the outer side in the radial direction in rotational drive of the clutch piston are prevented. Accordingly, the lock-up device can prevent generation of hysteresis torque by friction between the damper spring and the clutch piston and improve attenuation performance of torque variation of the engine. In particular, in order to efficiently attenuate torque variation of the engine, use of the damper spring with low spring constant is effective. However, the damper spring with low spring constant can be easily deformed to the clutch piston side as well by buckling in contraction. Nevertheless, the lock-up device according to the present invention can effectively prevent deformation of the damper spring with low spring constant to the clutch piston side as well.

Further, another feature of the present invention is, in the lock-up device, that at least one of the pair of damper pressing portions is formed so that a part of the outer side of the clutch piston in the radial direction projects toward the damper spring side relative to a part of the inner side of the clutch piston in the same radial direction.

According to another feature of the present invention with this structure, in the lock-up device, at least one of the pair of damper pressing portions is formed so that a part of the outer side of the clutch piston in the radial direction projects toward the damper spring side relative to a part of the inner side of the clutch piston in the same radial direction. Therefore, it is possible to press the damper spring with high accuracy so that the damper spring projects toward the inner side of the clutch piston in the radial direction. The pair of damper pressing portions may be formed so that at least one of them only contacts with an outer part of the clutch piston in the radial direction than the axis in the damper spring.

Further, another feature of the present invention is, in the lock-up device, the intermediate member is formed in an amount of projection so that the projecting part projects toward the outer side of the clutch piston in the radial direction than the side surface of the inner side of the clutch piston in the same radial direction in the center part of the damper spring until the rotational number of the clutch piston reaches at least 1500 rpm.

According to another feature of the present invention with this structure, in the lock-up device, the projecting part of the intermediate member projects toward the outer side in the radial direction than the side surface of the inner side of the center part of the damper spring in the same radial direction until the rotational number of the clutch piston reaches at least 1500 rpm (including the rotational number that can be regarded as substantially 1500 rpm even if it is less than 1500 rpm). Therefore, it is possible to improve attenuation performance of torque variation in low rotational range of the engine.

In addition, another feature of the present invention is that, in the intermediate member of the lock-up device, the projecting part is formed in a wall shape extending along a side surface of the damper spring.

According to another feature of the present invention with this structure, in the lock-up device, the projecting part of the intermediate member is formed in a wall shape extending along a side surface of the damper spring. Therefore, the projecting part can receive the side surface of the damper spring with high accuracy even in contraction of the damper spring.

In addition, the present invention can be implemented not only as an invention of a lock-up device but also as an invention of a torque converter including the lock-up device.

Specifically, the torque converter preferably includes: a pump impeller rotationally driven by a driving force of an engine; a turbine runner provided to face the pump impeller so as to be rotationally driven; hydraulic oil provided between the pump impeller and the turbine runner; and the lock-up device according to any one of claims 1 to 4. In the torque converter with this structure, the same effect as the lock-up device described above can be expected.

DESCRIPTION OF THE EMBODIMENTS

Figure 1:
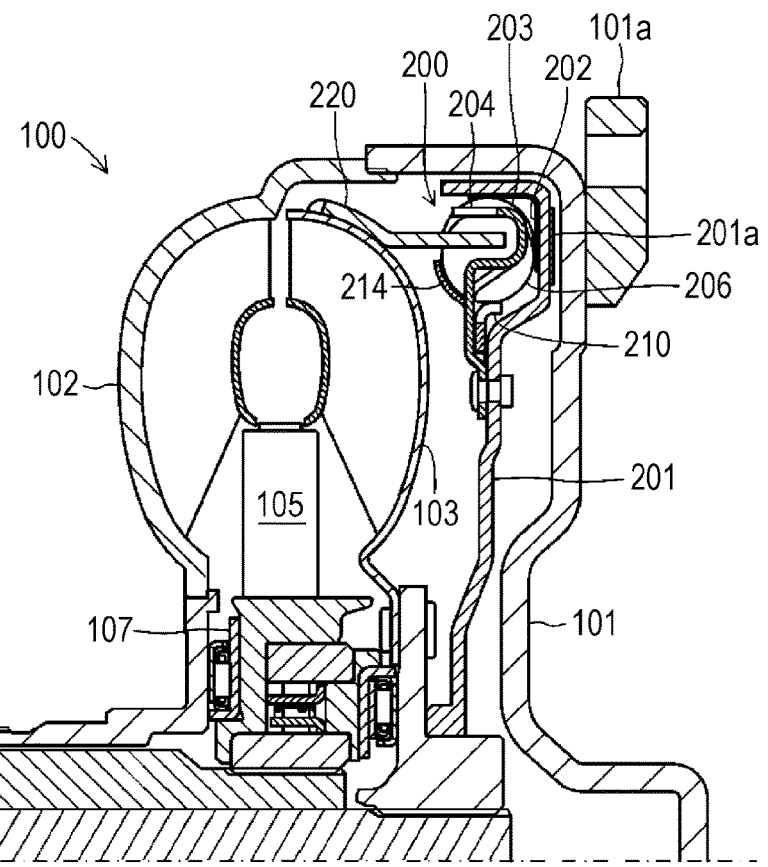
FIG. 1 is a cross-sectional view schematically illustrating a structure of a torque converter including a lock-up device according to the present invention.
Figure 2:
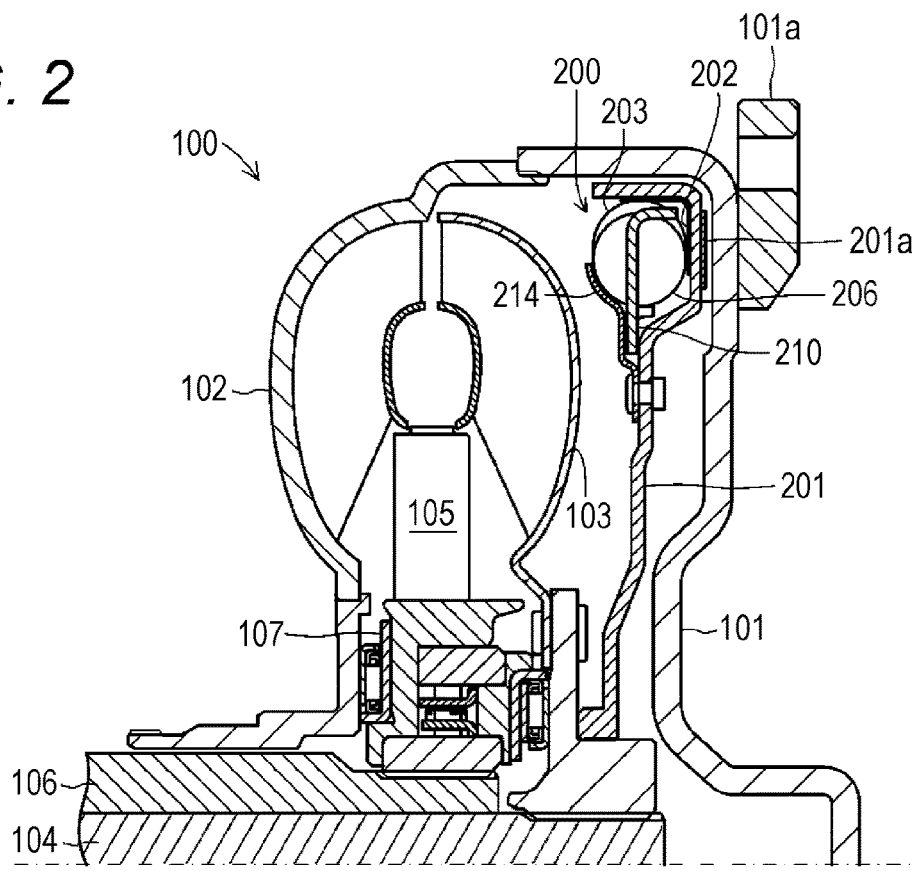
FIG. 2 is a cross-sectional view schematically illustrating the structure of the torque converter illustrated in FIG. 1 from a different angle.
Figure 3:
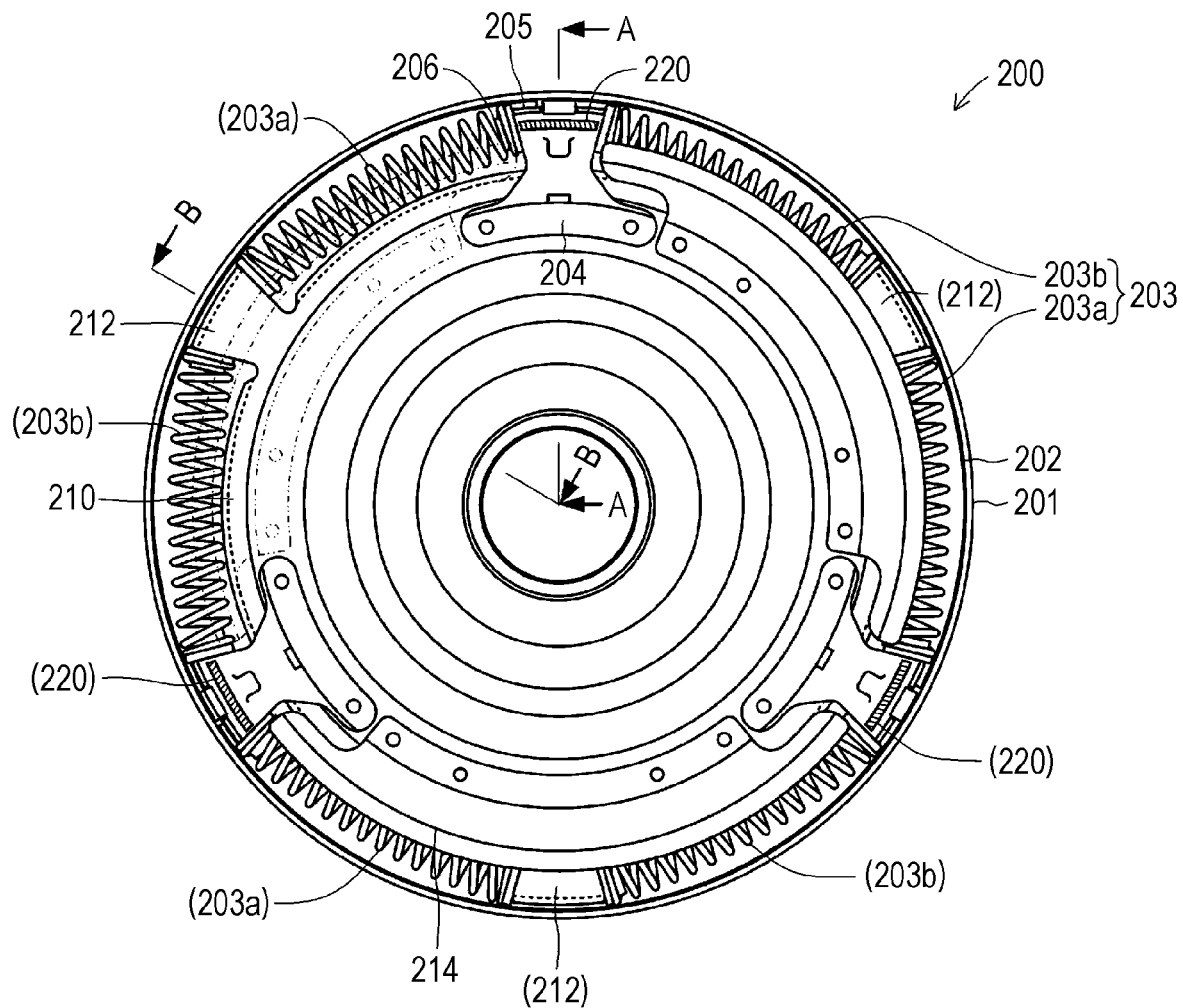
FIG. 3 is a front view schematically illustrating the lock-up device in the torque converter illustrated in FIGS. 1 and 2.

One embodiment of a lock-up device according to the present invention and a torque converter including the lock-up device will be described below with reference to the drawings. FIG. 1 is a cross-sectional view schematically illustrating a structure of a torque converter 100 including a lock-up device 200 according to the present invention. FIG. 1 corresponds to a cross-sectional view of the torque converter 100 along the line A-A in FIG. 3. FIG. 2 is a cross-sectional view schematically illustrating the structure of the torque converter 100 including the lock-up device 200 according to the present invention in a cross-section different from FIG. 1. FIG. 2 corresponds to a cross-sectional view of the torque converter 100 along the line B-B in FIG. 3. FIG. 3 is a front view of the lock-up device 200 in the torque converter 100 illustrated in FIGS. 1 and 2. The torque converter 100 is mainly a mechanical device provided between an engine and a transmission in an automobile including an automatic transmission (so-called automatic car) that amplifies a driving force of the engine to transmit to the transmission.

(Structure of Torque Converter 100)

The torque converter 100 includes a torque converter cover 101. The torque converter cover 101 is a part that is rotationally driven by a driving force from an engine of a vehicle not illustrated. The torque converter cover 101 is substantially cup-shaped in which an edge of a disk bends and extends. In the torque converter cover 101, a back face (side surface in right side in the drawing) is connected to a crank shaft (not illustrated) extending from the engine via a connecting member 101a, and a pump impeller 102 is provided to the bending edge.

The pump impeller 102 is an impeller that is rotationally driven together with the torque converter cover 101 and supplies hydraulic oil (not illustrated) to a turbine runner 103. The pump impeller 102 is fixed to the torque converter cover 101 and attached to a stator 105 so that the pump impeller 102 can rotate relative to the stator 105. The turbine runner 103 is an impeller that rotates with flow of hydraulic oil by rotational drive of the pump impeller 102. The turbine runner 103 is provided to face the pump impeller 102 so that the turbine runner 103 can rotate relative to the pump impeller 102. Specifically, the turbine runner 103 is spline-fitted to an output axis 104 that extends from a transmission not illustrated. In addition, the turbine runner 103 is attached to the stator 105 so that the turbine runner 103 can rotate relative to the stator 105.

The stator 105 is an impeller that rectifies the flow of the hydraulic oil refluxed from the turbine runner 103 and supplies the hydraulic oil to the pump impeller 102. The stator 105 is attached to a stator shaft 106 supported by the transmission so as not to be able to rotate via a one-way clutch 107. The one-way clutch 107 is a part to support the stator 105 so that the stator 105 can rotate only in the same direction as the rotational direction of the turbine runner 103. The one-way clutch 107 is spline-fitted on the stator shaft 106.

The lock-up device 200 is provided between the torque converter cover 101 and the turbine runner 103. The lock-up device 200 is a mechanical device that connects the pump impeller 102 and the turbine runner 103 without hydraulic oil and includes a clutch piston 201. The clutch piston 201 is a part for connecting or disconnecting the turbine runner 103 to the torque converter cover 101 formed integrally with the pump impeller 102. The clutch piston 201 is substantially circular-tray-shaped in which an edge of a disk bends and extends.

The clutch piston 201 is slidably fitted on and supported by a tubular part of the turbine runner 103 that is spline-fitted to the output axis 104 so that the clutch piston 201 is displaced against an inner surface of the torque converter cover 101 so as to contact with or move away from the inner surface of the torque converter cover 101. At an outer edge of the clutch piston 201, a plate surface at the torque converter cover 101 side projects toward the inner surface at the torque converter cover 101 and a plate surface of the turbine runner 103 side dents in a concave shape. In the clutch piston 201, a friction member 201*a* is provided at the part of the torque converter cover 101 that projects toward the inner surface, and a damper spring 203 is provided at the part that dents in the concave shape via a guide plate 202.

The guide plate 202 is a metal part provided between the damper spring 203 and an inner surface of the clutch piston 201 to prevent friction contact of the damper spring 203 and the inner surface of the clutch piston 201 and to improve stretch properties of the damper spring 203. The guide plate 202 includes three curved pieces formed by dividing a ring part corresponding to the circumferential direction of the clutch piston 201 equally in three pieces. The cross-sectional shape of the guide plate 202 is formed in a substantially L-shape corresponding to a corner on the inner surface of the clutch piston 201.

The damper spring 203 is a part for attenuating variation of rotational driving force (torque) transmitted from the engine via the torque converter cover 101 to transmit the attenuated variation to the turbine runner 103. The damper spring 203 is made of a steel coil spring. The damper spring 203 includes two damper springs 203*a* and 203*b* provided between three damper holders 204 that are provided on a surface of the turbine runner 103 via an intermediate member 210.

The damper holder 204 is a part for receiving both ends of the damper spring 203 including the pair of damper springs 203*a* and 203*b* and for letting the center part of the damper spring 203 project toward the inner side of the clutch piston 201 in the radial direction. The damper holder 204 extends from the inner side of the clutch piston 201 in the radial direction toward the outer side. More specifically, the damper holder 204 is attached to a location in the clutch piston 201 that is inner side in the radial direction relative to the location where the damper spring 203 is provided. In addition, the damper holder 204 is formed so that a damper pressing portion 205 extends to the outer side in the radial direction from the location where the damper holder 204 is attached.

The damper pressing portion 205 is a part where the both ends of the damper spring 203 contacts via a receiving piece 206. The damper pressing portion 205 is formed so that an outer part of the clutch piston 201 in the radial direction in the damper pressing portion 205 projects to the damper spring 203 side relative to an inner part in the same radial direction. In other words, the damper pressing portion 205 is formed so that the width along the circumferential direction of the clutch piston 201 extends toward the outer side of the clutch piston 201 in the radial direction. In addition, the damper pressing portion 205 is formed to dent to the clutch piston 201 side so that a connecting member described later can be displaced along the circumferential direction of the clutch piston 201.

Figure 4:
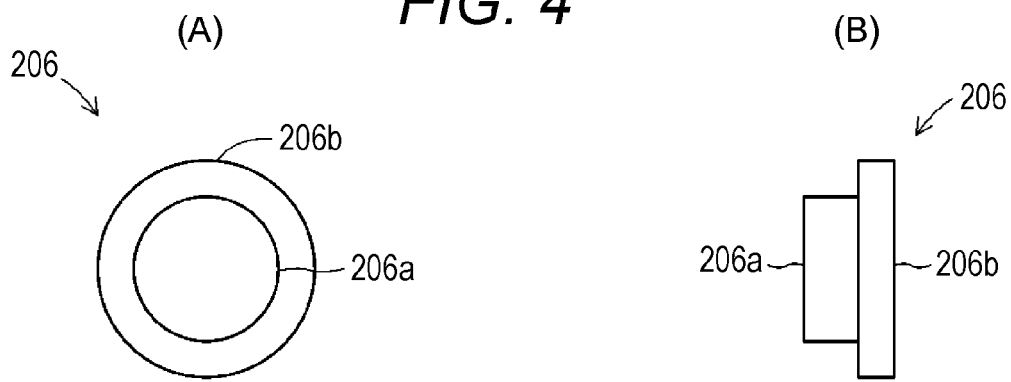
FIGS. 4(A) and 4(B) illustrate an external structure of a receiving piece illustrated in FIGS. 1 to 3. Fig. (A) is a front view of the receiving piece and Fig. (B) is a side view of the receiving piece.

As illustrated in FIG. 4, the receiving piece 206 is a part to be fitted to both ends of each of the damper springs 203*a* and 203*b* included in the damper spring 203. The receiving piece 206 includes two cylindrical parts of a fitting part 206*a* fitted in a hole of the damper spring 203 and an end face fixing part 206*b* to be fixed to the edge of the damper spring 203.

Figure 5:
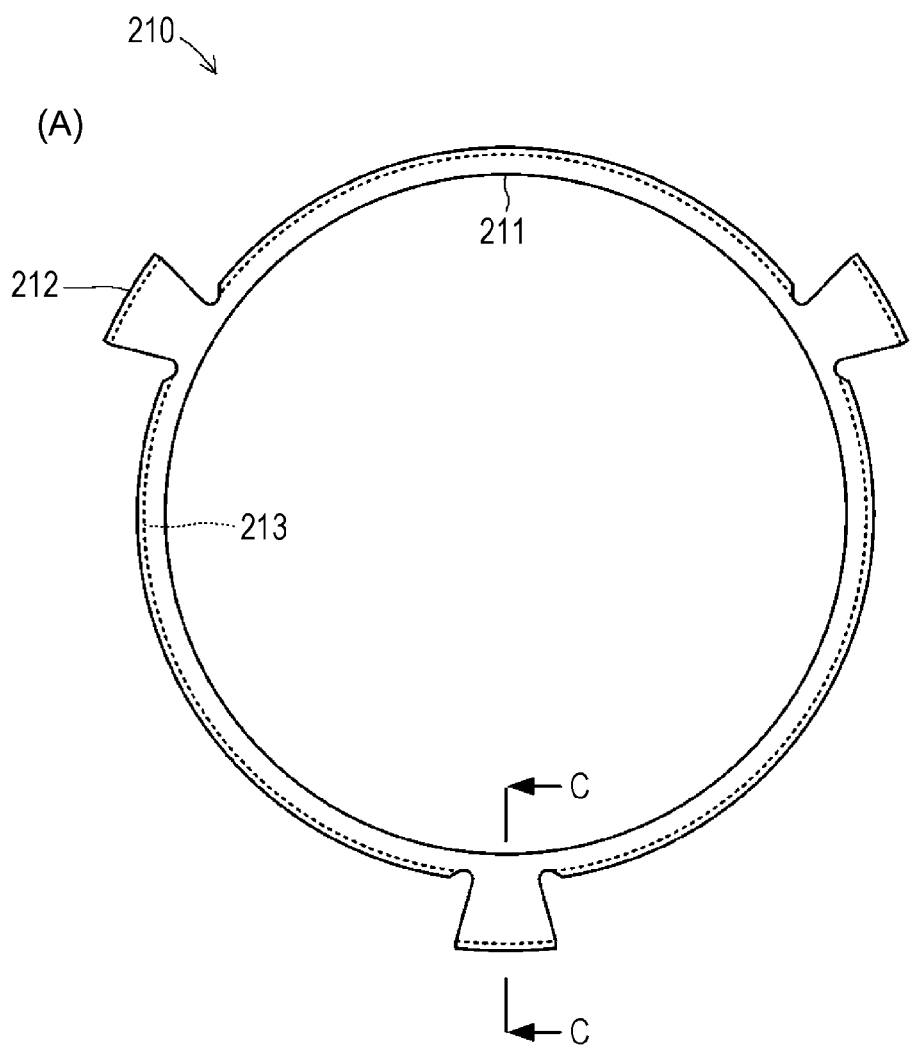
FIGS. 5(A) and 5(B) illustrate an external structure of an intermediate member illustrated in FIGS. 1 to 3. Fig. (A) is a front view of the intermediate member and Fig. (B) is a cross-sectional view of the intermediate member along the line C-C in Fig. (A).
Figure 5:
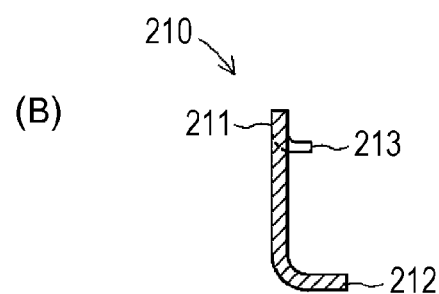

As illustrated in FIGS. 5(A) and 5(B), the intermediate member 210 is a metal part for regulating movement and deformation of the damper spring 203 *a* and the damper spring 203 *b*. The intermediate member 210 mainly includes a main circular part 211, damper pressing portions 212, and projecting parts 213. Among these, the main circular part 211 is a part to be slidably attached to a location in the clutch piston 201 that is inner side in the radial direction relative to the location where the damper spring 203 is provided. The main circular part 211 is formed in a ring shape. On the periphery of the main circular part 211, damper pressing portions 212 are formed to project toward the outer side in the radial direction at the locations where the main circular part 211 is equally divided into three. In addition, projecting parts 213 are formed between the three damper pressing portions 212 by bending the periphery of the damper pressing portions 212 toward the inner surface of the clutch piston 201 to define a bent portion.

As with the damper pressing portion 205, the damper pressing portion 212 is a part where edges of the damper spring 203*a* and the damper spring 203*b* that face each other contact via the receiving piece 206. The damper pressing portion 212 is formed so that part of the clutch piston 201 in the outer side in the radial direction extends to the damper spring 203 side relative to an inner part in the same radial direction. In other words, the damper pressing portion 212 is formed so that the width along the circumferential direction of the clutch piston 201 extends toward the outer side of the clutch piston 201 in the radial direction.

The damper pressing portion 212 is provided between the damper spring 203*a* and the damper spring 203*b* and serially connects the damper spring 203*a* and the damper spring 203*b*. Accordingly, the damper spring 203*a* and damper spring 203*b* between the damper pressing portion 205 and the damper pressing portion 212 are deformed so that center parts of the damper spring 203*a* and the damper spring 203*b* project to the inner side of the clutch piston 201 in the radial direction relative to both ends. That is, the damper pressing portion 205 and the damper pressing portion 212 correspond to a pair of damper pressing portions according to the present invention.

The projecting part 213 is a part for receiving the center parts of the damper springs 203*a* and 203*b* subject to a force toward the inner side of the clutch piston 201 in the radial direction by the damper pressing portion 205 and the damper pressing portion 212 and for regulating displacement and deformation toward the inner side in the same radial direction. The projecting part 213 bends and extends from the main circular part 211 in a projecting amount to receive side surfaces of the damper springs 203a and 203b.

The projecting amount of the projecting part 213 is an amount projecting to the outer side of the damper springs 203a and 203b in the radial direction than the side surfaces of the inner periphery of the damper springs 203a and 203b at least when the damper springs 203a and 203b are deformed in an arc-shape and arranged in the circumferential direction of the clutch piston 201 when the projecting part 213 does not exist. In the present embodiment, the projecting amount of the projecting part 213 is set so that the projecting part 213 can contact with side surfaces of the center parts of the damper springs 203a and 203b even if the clutch piston 201 is rotationally driven by the speed of 1500 rpm. That is, the outer diameter of the main circular part 211 according to the present embodiment is formed in a circular shape with a diameter so that the main circular part 211 can contact with the side surfaces of the center parts of the damper springs 203a and 203b even if the clutch piston 201 is rotationally driven by the speed of 1500 rpm.

In the intermediate member 210, the main circular part 211 is attached on the clutch piston 201 so that the main circular part 211 is slidable in the circumferential direction and the damper pressing portions 212 are located in the middle of the three damper holders 204 in the circumferential direction. Accordingly, the damper springs 203a and 203b are housed in the clutch piston 201 so that both ends of the damper springs 203a and 203b are pressed by the damper pressing portion 205 and the damper pressing portion 212 and the center parts of the damper springs 203a and 203b are displaced and/or deformed toward the inner side of the clutch piston 201 in the radial direction to be pushed onto the projecting part 213.

In addition, on the clutch piston 201, a cover 214 is attached on the intermediate member 210 in the middle of the three damper holders 204. The cover 214 covers a part of the intermediate member 210 and a part of the damper spring 203 and supports the intermediate member 210 so that the intermediate member 210 is slidable. In FIG. 3, one of the three covers 214 is shown by a two-dot chain line in order to clarify the internal structure of the cover 214.

A connecting member 220 is a metal part for connecting the turbine runner 103 to the clutch piston 201. The connecting member 220 is formed in a plate-shape extending from the periphery of the turbine runner 103. A tip of the connecting member 220 extends in the damper pressing portion 212 of the damper holder 204 and contacts with one edge of the damper spring 203a. In this case, the tip of the connecting member 220 is formed so that the tip contacts with a part of the damper spring 203a in the outer side of the clutch piston 201 in the radial direction than the axis via the receiving piece 206. Accordingly, the connecting member 220 can deform the center part so that the center part projects toward the inner side of the clutch piston 201 in the radial direction than both ends when the damper spring 203a is pressed as with the damper pressing portions 205 and 212. That is, in the present embodiment, the tip of the connecting member 220 corresponds to the damper pressing portion according to the present invention.

(Actuation of Torque Converter 100)

Next, actuation of the torque converter 100 with the structure described above will be described. The torque converter 100 is provided and functions between an engine and a transmission in a so-called automatic car. Specifically, in the torque converter 100, a rotational driving force of the engine is transmitted to the torque converter cover 101 first by release of a brake and pressing of an accelerator pedal by a driver of the vehicle, and the torque converter cover 101 and the pump impeller 102 are rotationally driven together. Next, in the torque converter 100, the turbine runner 103 is rotationally driven by circulation of hydraulic oil in the torque converter 100. Accordingly, the vehicle starts running.

Thereafter, in the torque converter 100, pressure in an area between the torque converter cover 101 and the clutch piston 201 is reduced, and the clutch piston 201 is displaced to the torque converter cover 101 side to be strongly pushed onto an inner surface of the torque converter cover 101. Accordingly, the turbine runner 103 is directly connected to the clutch piston 201 connected to the torque converter cover 101 via the damper spring 203 and the connecting member 220. That is, in the torque converter 100, the pump impeller 102 and the turbine runner 103 are directly connected by the lock-up device 200 (hereinafter referred to as "lock-up state").

Figure 6:
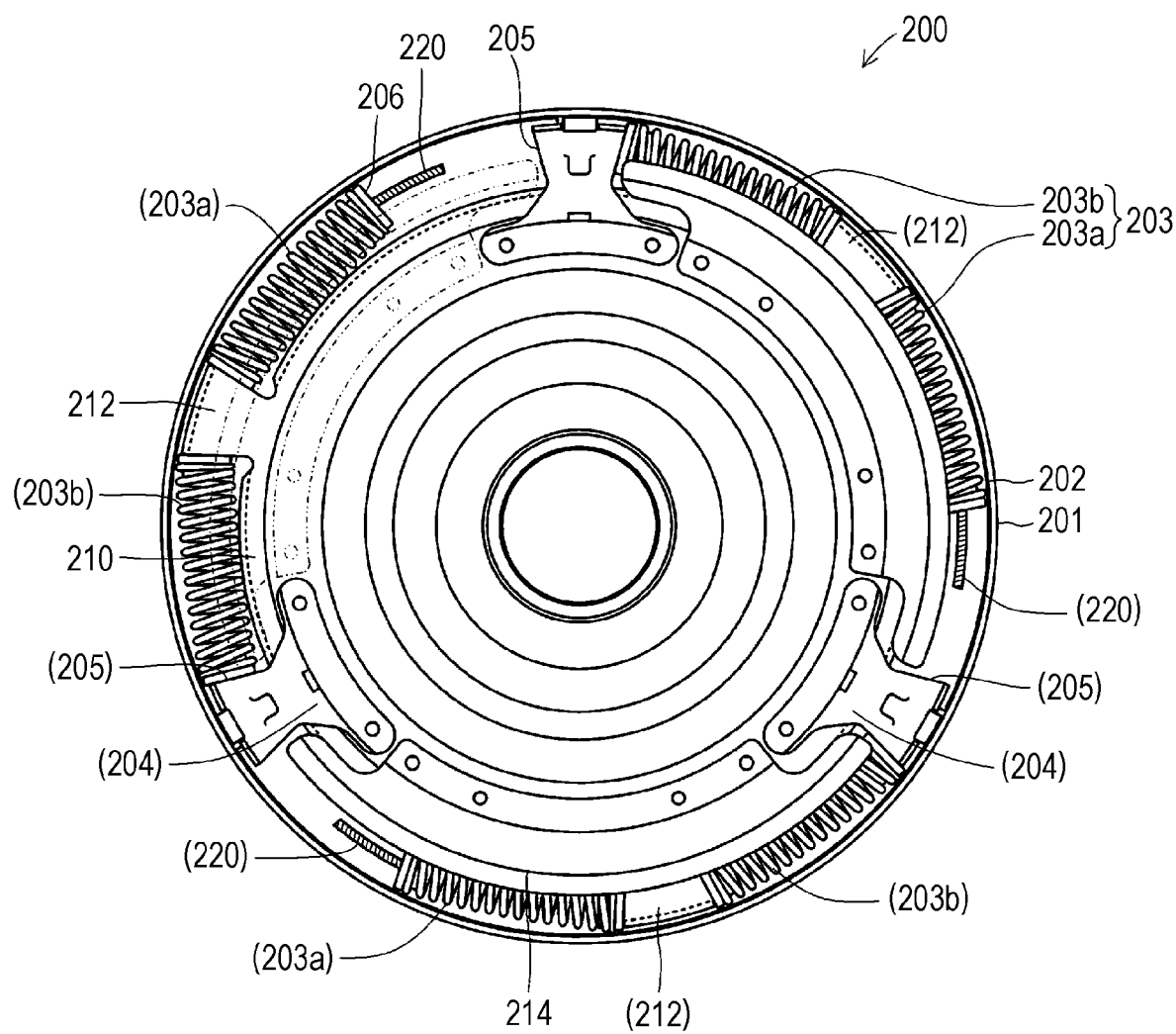
FIG. 6 is a front view schematically illustrating an actuation state (torsion state of about 30 Nm) of the lock-up device illustrated in FIG. 3.

In the lock-up state, torque variation from the engine is attenuated by the damper spring 203. That is, as illustrated in FIG. 6, the lock-up device 200 attenuates the torque variation by extension and contraction of the damper spring 203 in accordance with the torque variation from the engine. More specifically, the damper spring 203a out of the pair of damper springs 203a and 203b included in the damper spring 203 is pressed between a tip of the connecting member 220 and the damper pressing portion 212 to be compressively deformed. In addition, the damper spring 203b is pressed between the damper pressing portion 212 and the damper pressing portion 205 to be compressively deformed.

In this case, the center part of the damper spring 203a is projected to the projecting part 213 side and pushed onto the projecting part 213 by the tip of the connecting member 220 and the damper pressing portion 212. Therefore, displacement or deformation of the damper spring 203a to the outer side of the clutch piston 201 in the radial direction is regulated. In addition, the center part of the damper spring 203b is projected to the projecting part 213 side and pushed onto the projecting part 213 by the damper pressing portion 212 and the damper pressing portion 205. Therefore, displacement or deformation of the damper spring 203b to the outer side of the clutch piston 201 in the radial direction is regulated. Accordingly, increase in hysteresis torque is prevented in the lock-up device 200 that is caused by contact of the damper springs 203a and 203b with the inner periphery of the clutch piston 201 by rotational drive of the clutch piston 201.

Here, the result of the experiment carried out by the inventors will be described. The inventors carried out a comparison experiment of hysteresis torque and attenuation performance of the damper spring 203 in the lock-up device 200 according to the present embodiment and a lock-up device known to the inventors. In the lock-up device known to the inventors, the damper spring 203 is provided inside the clutch piston 201 along the circumferential direction so that the damper spring 203 is curved in an arc-shape. In addition, in the lock-up device known to the inventors, both ends of the damper spring 203 are between damper pressing portions in parallel with the both ends. The center part of the damper spring 203 is not supported by the intermediate member 210. In addition, a tip of a connecting member extending from the turbine runner 103 faces on the axis of the damper spring 203.

Figure 7:
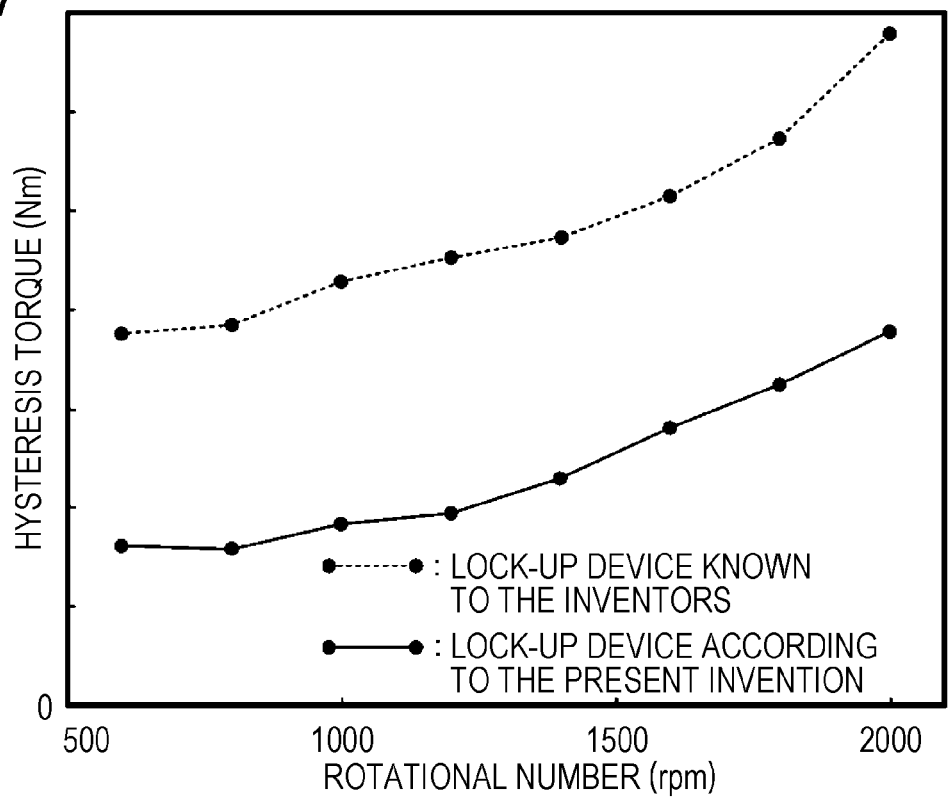
FIG. 7 shows a result of a comparison experiment of hysteresis torque in the torque converter including the lock-up device according to the present invention and a torque converter known to the inventors, in which the vertical axis represents hysteresis torque and the horizontal axis represents the rotational number of the engine.
Figure 8:
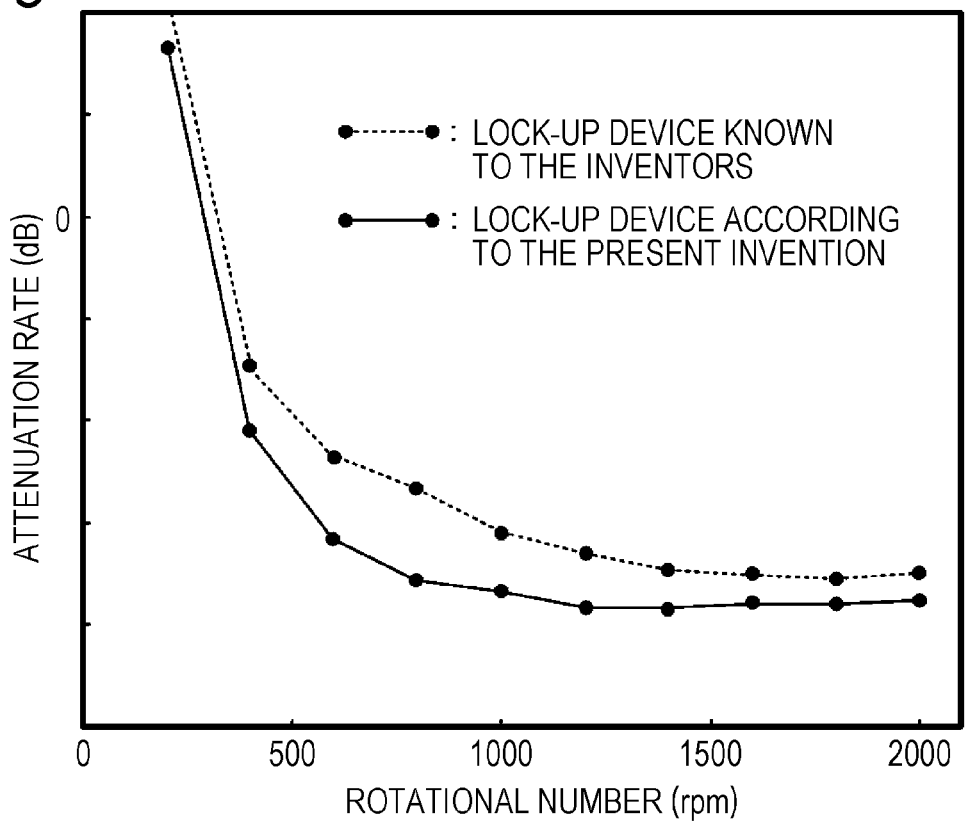
FIG. 8 shows a result of a comparison experiment of attenuation performance of the torque converter including the lock-up device according to the present invention and a torque converter known to the inventors, in which the vertical axis represents the attenuation rate and the horizontal axis represents the rotational number of the engine.

FIG. 7 is a comparison graph of hysteresis torque in the lock-up device 200 according to the present embodiment and in the lock-up device known to the inventors. The vertical axis represents the amount of hysteresis torque and the horizontal axis represents the rotational number of the clutch piston 201. FIG. 8 is a comparison graph of attenuation performance in the lock-up device 200 according to the present embodiment and the lock-up device known to the inventors. The vertical axis represents the attenuation rate of variation torque and the horizontal axis represents the rotational number of the clutch piston 201. According to FIGS. 7 and 8, it is clearly shown that the lock-up device 200 according to the present embodiment can reduce hysteresis torque and attenuate torque variation as compared with the lock-up device known to the inventors.

As understood from the above description of actuation, according to the above embodiment, in the lock-up device 200, the damper pressing portions 205 and 212 and the connecting member 220 press the center part of the damper spring 203 onto the projecting part 213 of the intermediate member 210. Therefore, displacement and deformation of the damper spring 203 to the outer side in the radial direction in rotational drive of the clutch piston 201 are prevented. Accordingly, the lock-up device 200 can prevent generation of hysteresis torque by friction between the damper spring 203 and the clutch piston 201 and improve attenuation performance of torque variation of the engine. In particular, in order to efficiently attenuate torque variation of the engine, use of the damper spring 203 with low spring constant is effective. However, the damper spring 203 with low spring constant can be easily deformed to the clutch piston 201 side as well by buckling in contraction. Nevertheless, the lock-up device 200 according to the present invention can effectively prevent deformation of the damper spring 203 with low spring constant to the clutch piston 201 side as well.

In addition, implementation of the present invention is not limited to the embodiment described above, and the present invention may be modified in various ways without departing from the purpose of the present invention. In description of modifications, the component same as the embodiment described above is given the same reference sign.

For example, in the above embodiment, in the lock-up device 200, parts of the damper pressing portions 205 and 212 sandwiching the damper spring 203 from both ends that contact with the damper spring 203 in the outer side of the clutch piston 201 in the radial direction project to the damper spring 203 side (in other words, to the circumferential direction) relative to the parts in the inner side in the same radial direction. However, it is sufficient if the damper pressing portions 205 and 212 gives a force for the center part of the damper spring 203 to project toward the inner side of the clutch piston 201 in the radial direction. Therefore, it is sufficient if the damper pressing portions 205 and 212 are formed so that a part of the clutch piston 201 in the outer side in the radial direction of at least one of the damper pressing portions 205 and 212 provided at both ends of the damper springs 203a and 203b projects to the damper spring 203 side relative to the part in the inner side in the same radial direction.

In the above embodiment, the connecting member 220 is provided to press a part of the clutch piston 201 in the outer side in the radial direction than the axis in the damper spring 203a so that the center part of the damper spring 203 projects toward the inner side of the clutch piston 201 in the radial direction. Therefore, the damper pressing portion according to the present invention may include only the connecting member 220 according to the present embodiment instead of the damper pressing portions 205 and 212 according to the embodiment described above.

Figure 9:
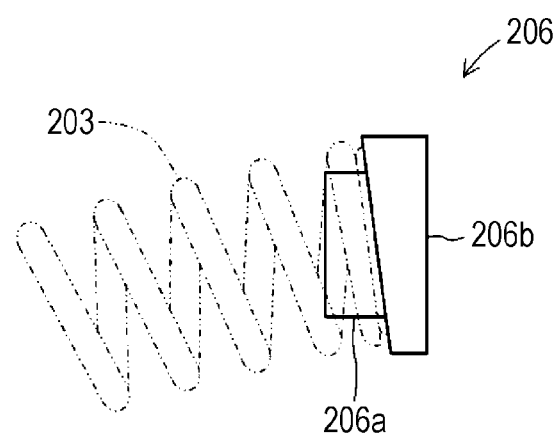
FIG. 9 is a side view schematically illustrating an external structure of a receiving piece according to a modification of the present invention.

Furthermore, the damper pressing portion according to the present invention may include the receiving piece 206 instead of or in addition to the damper pressing portions 205 and 212 and the connecting member 220 according to the embodiment described above. Specifically, as illustrated in FIG. 9 for example, in the receiving piece 206, the thickness of the end face fixing part 206b changes from one edge to the other edge between the edges that face each other. Then the receiving piece 206 with this structure is attached in the direction in which a part at the outer side of the clutch piston 201 in the radial direction projects toward the damper spring 203 side relative to a part at the inner side in the same radial direction. Also with this structure, the same effect given by the damper pressing portions 205 and 212 according to the embodiment described above can be expected. In FIG. 9, the damper spring 203 is shown by a two-dot chain line.

Furthermore, in the embodiment described above, the projecting part 213 is formed in a wall shape extending between the three damper pressing portions 212. However, it is sufficient if the projecting part 213 can receive the damper spring 203 projecting toward the inner side of the clutch piston 201 in the radial direction. Therefore, the projecting part 213 may be formed partly or intermittently on the main circular part 211. In addition, in the embodiment described above, the projecting part 213 is formed as an outer edge of the main circular part 211 formed in a ring shape. However, the projecting part 213 may be formed so as to project from the outer edge of the main circular part 211 in a convex shape.

Furthermore, the damper pressing portion and the projecting part according to the present invention are provided for each damper spring 203 (damper springs 203a and 203b). Therefore, the number of the damper pressing portions and the projecting parts is not limited to the embodiment described above, and it is sufficient if these components are provided for each damper spring 203. The number of the damper springs 203 (damper springs 203a and 203b), the number of the damper holders 204, and the number of the damper pressing portions 212 provided to the intermediate member are not limited to the embodiment described above, and it is easily understood that it is sufficient if these components are appropriately provided in accordance with the specification of the torque converter 100.

DESCRIPTION OF REFERENCE SIGNS

100 Torque converter
101 Torque converter cover
101a Connecting member
102 Pump impeller
103 Turbine runner
104 Output axis
105 Stator
106 Stator shaft
107 One-way clutch
200 Lock-up device
201 Clutch piston
201a Friction member
202 Guide plate
203, 203a, 203b Damper spring
204 Damper holder
205 Damper pressing portion
206 Receiving piece
206a Fitting part
206b End face fixing part
210 Intermediate member
211 Main circular part 212 Damper pressing portion
213 Projecting part
214 Cover
220 Connecting member

The invention claimed is:

1. A lock-up device comprising:
a disk-shaped clutch piston supported so as to contact with or move away from a pump impeller that is rotationally driven by a driving force of an engine;
a coiled damper spring provided to the clutch piston along a circumferential direction;
a connecting member for connecting the clutch piston to a turbine runner, the turbine runner being provided to face the pump impeller via hydraulic oil, the clutch piston and the turbine runner being connected via the damper spring;
a receiving piece fitted to both ends of the damper spring;
a pair of damper pressing portions configured to bias a center part of the damper spring toward a center part of the clutch piston by contacting the damper spring via the respective receiving piece and sandwiching the damper spring from both ends of the damper spring; and
an intermediate member, rotatable relative to the clutch piston, with a projecting part configured to restrict the center part of damper spring from being deformed toward a central axis of the clutch piston in a radial direction, the projecting part extending as a bent portion from an outer periphery of a main circular part of the intermediate member along an inner side surface of the damper spring, and formed in a wall shape extending between and beyond the damper pressing portions.

2. The lock-up device according to claim 1, wherein at least one of the pair of damper pressing portions has an inner portion closer to the center of the clutch piston than an outer portion, the outer portion having a substantially overall acute trapezoid shape.

3. The lock-up device according to claim 1, wherein the projecting part has a circular periphery that contacts the center of the damper spring when a rotational speed of the clutch piston is at least 1500 rotations per minute.

4. The lock-up device according to claim 1, wherein the wall shape of the projecting part extends along a side surface of the damper spring.

5. A torque converter comprising:
a pump impeller rotationally driven by a driving force of an engine;
a turbine runner provided to face the pump impeller so as to be rotationally driven;
hydraulic oil provided between the pump impeller and the turbine runner; and
a lock-up device, comprising:
    a disk-shaped clutch piston supported so as to contact with or move away from a pump impeller that is rotationally driven by a driving force of an engine;
    a coiled damper spring provided to the clutch piston along a circumferential direction;
    a connecting member for connecting the clutch piston to a turbine runner, the turbine runner being provided to face the pump impeller via hydraulic oil, the clutch piston and the turbine runner being connected via the damper spring;
    a receiving piece fitted to both ends of the damper spring;
    a pair of damper pressing portions configured to bias a center part of the damper spring toward a center of the clutch piston by contacting the damper spring via the respective receiving piece and sandwiching the damper spring from both ends of the damper spring; and
    an intermediate member, rotatable relative to the clutch piston, with a projecting part configured to restrict the center part of damper spring from being deformed toward a central axis of the clutch piston in a radial direction, the projecting part extending as a bent portion from an outer periphery of a main circular part of the intermediate member along an inner side surface of the damper spring, and formed in a wall shape extending between and beyond the damper pressing portions.

6. The lock-up device according to claim 2, wherein the projecting part has a circular periphery that contacts the center of the damper spring when a rotational speed of the clutch piston is at least 1500 rotations per minute.

7. The lock-up device according to claim 2, wherein the wall shape of the projecting part extends along a side surface of the damper spring.

8. The lock-up device according, to claim 3, wherein the wall shape of the projecting part extends along a side surface of the damper spring.

9. The torque converter of claim 5, wherein at least one of the pair of damper pressing portions has an inner portion closer to the center of the clutch piston than an outer portion, the outer portion having a substantially overall acute trapezoid shape.

10. The torque converter of claim 5, wherein
the intermediate member has a circular periphery that contacts the center of the damper spring when a rotational speed of the clutch piston is at least 1500 rotations per minute.

11. The torque converter of claim 5, wherein
in the intermediate member, the wall shape of the projecting part extends along a side surface of the damper spring.

12. A torque converter of claim 9, wherein
the intermediate member has a circular periphery that contacts the center of the damper spring when a rotational speed of the clutch piston is at least 1500 rotations per minute.

13. A torque converter of claim 12, wherein the wall shape of the circular periphery extends along the damper spring.

14. A torque converter of claim 12, wherein in the intermediate member, the wall shape of the projecting part extends along a side surface of the damper spring.

* * * * *